United States Patent [19]

Ichiki

[11] Patent Number: 5,301,920
[45] Date of Patent: Apr. 12, 1994

[54] HIGH-SPEED SOLENOID VALVE APPARATUS

[75] Inventor: Nobuhiko Ichiki, Ibaraki, Japan

[73] Assignee: Hitachi Construction Machinery Co., Ltd., Tokyo, Japan

[21] Appl. No.: 27,091

[22] PCT Filed: Sep. 6, 1990

[86] PCT No.: PCT/JP90/01145
§ 371 Date: Jan. 28, 1991
§ 102(e) Date: Jan. 28, 1991

[87] PCT Pub. No.: WO91/03672
PCT Pub. Date: Mar. 21, 1991

Related U.S. Application Data

[63] Continuation of Ser. No. 646,721, Jan. 28, 1991, abandoned.

[30] Foreign Application Priority Data

Sep. 6, 1989 [JP] Japan .................. 1-229202

[51] Int. Cl.⁵ .................. F16K 31/06; F16K 31/40
[52] U.S. Cl. .................. 251/30.04; 137/491; 251/30.02
[58] Field of Search .......... 251/30.01, 30.03, 30.05, 251/30.02, 43, 30.04; 137/491

[56] References Cited

U.S. PATENT DOCUMENTS 2,964,286 12/1960 Hoskins .................. 251/30.04
3,977,649 8/1976 Zeuner et al. .......... 251/30.02 X
4,336,903 6/1982 Zirps .................... 137/491 X

FOREIGN PATENT DOCUMENTS 60-26871  2/1985 Japan .
62-292982 12/1987 Japan .
63-47583   2/1988 Japan .
1-156380  10/1989 Japan .
864659     4/1961 United Kingdom ........... 251/30.04

Primary Examiner—Gerald A. Michalsky
Assistant Examiner—Kevin L. Lee
Attorney, Agent, or Firm—Fay, Sharpe, Beall, Fagan, Minnich & McKee

[57] ABSTRACT

A high-speed solenoid valve apparatus has a body, and a high-speed solenoid valve section and a logic valve section disposed in the body. The high-speed solenoid valve section includes a solenoid valve outlet port communicating with a body outlet port, a solenoid valve sleeve including a solenoid valve inlet port, and a spool for opening and closing a communication path between the solenoid valve inlet port and the solenoid valve outlet port. The logic valve section has a logic valve sleeve guided by the inner wall of the body, having a logic valve inlet port communicating with a body inlet port and a logic valve outlet port communicating with the body outlet port, a poppet for controlling a communication path between the logic valve inlet port and the logic valve outlet port, a control chamber formed in the poppet and communicating with the logic valve inlet port via a small-diameter penetration hole, a return spring for applying a restoring force to the spool and the poppet, and a plate disposed between the solenoid valve sleeve and the logic valve sleeve and communicating between the control chamber and the solenoid valve inlet port. The solenoid valve sleeve and the plate are directly guided by the inner wall of the body, the solenoid valve outlet port is directly formed in the solenoid valve sleeve, and the solenoid valve sleeve, the plate and the logic valve sleeve are disposed in the body in closely stacked relation.

5 Claims, 4 Drawing Sheets

HIGH-SPEED SOLENOID VALVE APPARATUS

This application is a continuation of application Ser. No. 07/646,721, filed Jan. 28, 1991, now abandoned.

TECHNICAL FIELD

The present invention relates to a high-speed solenoid valve apparatus for opening and closing a fluid passage at a high speed.

BACKGROUND ART

A high-speed solenoid valve is used to open and close a fluid passage for various types of control in a hydraulic circuit, for example. Such a high-speed solenoid valve has superior characteristics; that is, it can be switched over at high frequency, can be operated by directly receiving a digital signal from a control unit such as a microcomputer, and also can perform flow rate control through switching at high frequency. An example in which the high-speed solenoid valve is employed for drive control of a hydraulic cylinder will be described below with reference to the drawing.

FIG. 1 is a circuit diagram of a hydraulic circuit using a high-speed solenoid valve. In the drawing, denoted by reference numeral 1 is a hydraulic pump and 2 is servo cylinder. Connected to a rod of the servo cylinder 2 is a displacement volume varying mechanism, e.g., a swash plate, of a variable displacement hydraulic pump (not shown). Reference numeral 3 designates a reservoir (tank), 4A is a high-speed solenoid valve interposed between the hydraulic pump 1 and the head side of the servo cylinder 2, and 4B is a high-speed solenoid valve interposed between the head side of the servo cylinder 2 and the reservoir 3.

In order to properly control a delivery rate of the variable displacement hydraulic pump, when a control signal is outputted from the microcomputer (not shown) to the high-speed solenoid valve 4A, for example, the high-speed solenoid valve 4A is switched to the lower shift position in the drawing. As a result, the servo cylinder 2 is driven in the direction of extension of the rod dependent on a difference in the pressure receiving area between both chambers of the servo cylinder 2, thereby increasing (or decreasing) a tilting amount of the swash plate. On the contrary, when a control signal is outputted to the high-speed solenoid valve 4B to switch it over to the lower shift position, the head side of the servo cylinder 2 is communicated with the reservoir 3, whereby the rod is contracted to decrease (or increase) a tilting amount of the swash plate. That operation is carried out with high responsibility by direct application of a digital signal to the valve from the microcomputer.

While the high-speed solenoid valve has the superior characteristics as mentioned above, it also has the problem below. More specifically, to achieve a high-speed operation, the high-speed solenoid valve must be so structured as to have a small diameter and short stroke of a spool. Therefore, the pressure loss is increased and the flow rate that can be handled is decreased. This necessarily limits the size, output and other rated values of the hydraulic cylinder, which can be directly controlled thereby. One means for solving this problem is to raise a pressure supplied to the high-speed solenoid valve. But, this means is unfavorable in that the energy loss becomes too large. Another solution means, of increasing the size of the high-speed solenoid valve, is difficult to practice from the above structural reason, so long as the current operating voltage is employed as it is. If the valve size is increased without respect of such limitations, the primary characteristic of the high-speed solenoid valve, i.e., the responsivity, would be deteriorated.

In view of the above existing state of the art, the inventor has previously proposed a high-speed solenoid valve apparatus disclosed in JP, A, 62-292982. This high-speed solenoid valve apparatus is shown in FIG. 2. Referring to FIG. 2, denoted by 10 is a body which forms an outer shell of the high-speed solenoid valve apparatus and which also has an inlet port 11 and an outlet port 12. Between the inlet port 11 and the outlet port 12, a high-speed solenoid valve section 10A and a logic valve section 10B are juxtaposed in the vertical direction. The high-speed solenoid valve section 10A comprises a first sleeve 13 forming an outer shell thereof, an inlet port 14 formed in the first sleeve 13, a passage 15 selectively communicating with the inlet port 14, an outlet port 16 communicating with the passage 15, and further a spool 17 movably disposed in the first sleeve 13 to open and close the communication between the inlet port 14 and the passage 15, and therefore, the outlet port 16. The logic valve section 10B comprises a second sleeve 18 disposed in the body 10 to surround the first sleeve 13 of the high-speed solenoid valve section 10A, an inlet port 19 formed in the second sleeve 18, an outlet port 20 selectively communicating with the inlet port 19, and a poppet 21 for opening and closing the communication between the inlet port 19 and the outlet port 20. The poppet 21 has a control chamber 22 formed therein, and a small-diameter penetration (through) hole 23 communicating between the inlet port 19 and the control chamber 22.

Denoted by 24 is a return spring disposed in the control chamber 22 of the poppet 21 for applying a restoring force to the poppet 21 and the spool 17, and 25 is a stopper disposed between the first sleeve 13 and the second sleeve 18, i.e., between the spool 17 and the poppet 21, for restricting movements of the spool 17 and the poppet 21. The return spring 24 and the stopper 25 are components commonly shared by the high-speed solenoid valve section 10A and the logic valve section 10B. Then, the inlet port 19 of the logic valve section 10B is communicated with the inlet port 11 of the body 10 and also with the control chamber 22 via the small-diameter penetration hole 23 as mentioned above. The control chamber 22 is in turn communicated with the inlet port 14 of the high-speed solenoid valve section 10A via a hole formed through the stopper 25. Further, the outlet port 20 of the logic valve section 10B and the outlet port 16 of the high-speed solenoid valve section 10A are communicated with a passage 26 which is formed in the body 10 and communicating with the outlet port 12 of the body 10.

The above high-speed solenoid valve apparatus operates as follows. When a coil of the high-speed solenoid valve section 10A is not energized, the spool 17 is pushed by the return spring 24 upwards in the drawing so that the inlet port 11 of the body 10, the inlet port 19 of the logic valve section 10B, the small-diameter penetration hole 23, the control chamber 22, and the inlet port 14 of the high-speed solenoid valve 10A are blocked off by engagement of valve seats respectively formed by the first sleeve 13 and the spool 17 with respect to the passage 15 and the outlet port 16 of the high-speed solenoid valve 10A, the passage 26 of the body 10, and the outlet port 12.

In addition, because the pressure in the inlet port 11 of the body 10 and the pressure in the control chamber 22 are equal to each other, the poppet 21 is pushed downwards on the drawing by a pressing force due to a difference in the pressure receiving area between the upper and lower surfaces of the poppet 21 and also a resilient force of the return spring 24, whereby the inlet port 11 of the body 10 and the inlet port 19 of the logic valve section 10B are blocked off with respect to the outlet port 20, the passage 26, and the outlet port 12 of the body 10.

When the coil of the high-speed solenoid valve section 10A is energized under that condition, the spool 17 of the high-speed solenoid valve section 10A is moved downwards in the drawing against the resilient force of the return spring 24, whereupon the hydraulic fluid in the control chamber 22 is quickly discharged from the outlet port 12 of the body 10 via the inlet port 14 of the high-speed solenoid valve section 10A, the passage 15, the outlet port 16 and the passage 26. On the other hand, the hydraulic fluid introduced from the inlet port 11 of the body 10 via the inlet port 19 of the logic valve section 10B is restricted by the small-diameter penetration hole 23 and cannot flow into the control chamber 22 immediately. The pressure in the control chamber 22 is reduced upon the above discharge of the hydraulic fluid from the high-speed solenoid valve section 10A. Therefore, the force tending to push the poppet 21 upwards in the drawing, which is given by the sum of the pressure applied to the lower surface of the poppet 21 facing the inlet port 19 and the pressure applied to the edge surface of the poppet 21 facing the outlet port 20, becomes greater than the force tending to push the poppet 21 downwards in the drawing, which is given by the sum of the pressure in the control chamber 22 and the resilient force of the return spring 24. This causes the poppet 21 to ascend until it strikes against the stopper 25. As a result, the inlet port 19 of the logic valve section 10B is communicated with the outlet port 20 thereof, and the hydraulic fluid incoming through the inlet port 19 of the body now also passes via the inlet port 19 of the logic valve section 10B, the outlet port 20 and the passage 26 and is then discharged through the outlet port 12 of the body 10, after being joined with the hydraulic fluid outgoing through the outlet port 16 of the high-speed solenoid valve section 10A. At this time, although the return spring 24 is compressed upon the upward movement of the poppet 21 and the force tending to push the spool 17 upwards is increased correspondingly, the force produced by the energized coil of the high-speed solenoid valve section 10A and tending to push the spool 17 downwards remains still much greater. Accordingly, the spool 17 will not be pushed upwards.

In the high-speed solenoid valve apparatus thus arranged, since the high-speed solenoid valve section 10A is associated with the logic valve section 10B, the hydraulic fluid can be discharged through both the outlet port 16 of the high-speed solenoid valve section 10A and the outlet port 20 of the logic valve section 10B, and then through the outlet port 12 of the body 10 after being joined in the passage 26, while the coil of the high-speed solenoid valve section 10A is being energized. It is therefore possible to supply the hydraulic fluid to an actuator or the like operated by the above high-speed solenoid valve apparatus at a flow rate higher than can be supplied in the case of using a conventional high-speed solenoid valve apparatus.

The proposed high-speed solenoid valve apparatus can also reduce the entire dimension of the body 10, i.e., the size of the outer configuration, because of such arrangements that the high-speed solenoid valve section 10A and the logic valve section 10B are vertically juxtaposed in the single body 10, the return spring 24 and the stopper 25 are commonly shared by both the high-speed solenoid valve section 10A and the logic valve section 10B, and the space between the control chamber 22 of the poppet 21 and the valve seat of the spool 17 is set small to be just sufficient to accommodate the stopper 25.

Further, since the space between the control chamber 22 of the poppet 21 and the valve seat of the spool 17 is set small as mentioned above, a response in rising and falling of the pressure in the control chamber 22 can be improved, which results in the good responsivity of the spool 17 and the superior control accuracy.

In spite of these excellent advantages, it is still desired to further reduce the entire dimension of the existing high-speed solenoid valve apparatus.

An object of the present invention is to provide a high-speed solenoid valve apparatus which can solve the above-described problem in the prior art and can further reduce the entire dimension of the apparatus.

DISCLOSURE OF THE INVENTION

To achieve the above object, the present invention provides a high-speed solenoid valve apparatus comprising a body having a body inlet port and a body outlet port, and a high-speed solenoid valve section and a logic valve section both disposed in the body, wherein the high-speed solenoid valve section comprises a solenoid valve outlet port communicating with the body outlet port, a solenoid valve sleeve formed with a solenoid valve inlet port, and a spool for opening and closing a communication path between the solenoid valve inlet port and the solenoid valve outlet port at a high speed in response to an electric signal, and wherein the logic valve section comprises a logic valve sleeve guided by the inner wall of the body and having both a logic valve inlet port communicating with the body inlet port and a logic valve outlet port communicating with the body outlet port, a poppet for opening and closing a communication path between the logic valve inlet port and the logic valve outlet port, a control chamber formed in the poppet and communicating with the logic valve inlet port via a small-diameter penetration hole, a return spring for applying a restoring force to the spool and the poppet, and a plate disposed between the solenoid valve sleeve and the logic valve sleeve and communicating between the control chamber and the solenoid valve inlet port, the apparatus being improved in that the solenoid valve sleeve and the plate are directly guided by the inner wall of the body, the solenoid valve outlet port is directly formed in the solenoid valve sleeve, and the solenoid valve sleeve, the plate and the logic valve sleeve are disposed in the body in closely stacked relation.

When the high-speed solenoid valve section is not energized, the spool blocks off the communication between the solenoid valve inlet port and the solenoid valve outlet port with the restoring force of the return spring, and the poppet also blocks off the communication between the logic valve inlet port and the logic valve outlet port with the restoring force of the return spring. The high-speed solenoid valve apparatus is thus held in a blocked-off state.

When the high-speed solenoid valve section is energized, the spool is driven against the resilient force of the return spring, and the solenoid valve inlet port is communicated with the solenoid valve outlet port. This causes the hydraulic fluid in the control chamber to be quickly discharged via the solenoid valve inlet port and the solenoid valve outlet port, whereupon the poppet is also driven against the resilient force of the return spring with the action of the fluid pressure for communicating between the logic valve inlet port and the logic valve outlet port. As a result, the high-speed solenoid valve apparatus is brought into an open state.

In the above high-speed solenoid valve apparatus, more specifically, the solenoid valve sleeve and the plate are disposed in place while being guided by guide portions formed on the inner wall of the body, and the plate is closely interposed between the solenoid valve sleeve and the logic valve sleeve.

Preferably, the solenoid valve sleeve, the plate and the logic valve sleeve have substantially the same outer diameter.

Preferably, the logic valve sleeve is in direct contact with a guide portion on the inner wall of the body without interposing an O-ring therebetween.

BEST MODE FOR CARRYING OUT THE INVENTION

Figure 3:
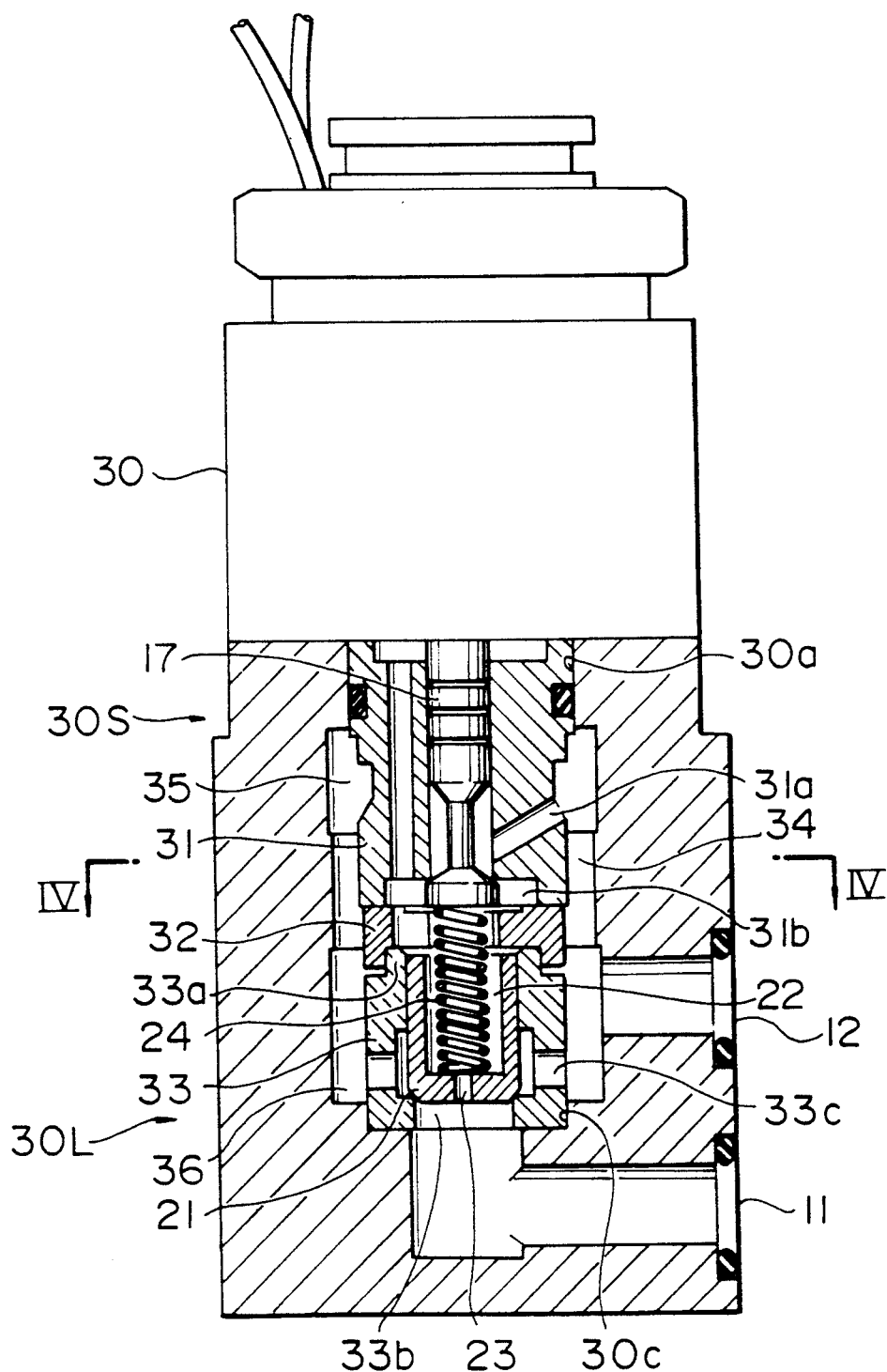
FIG. 3 is a partial sectional view of a high-speed solenoid valve apparatus according to one embodiment of the present invention.
Figure 4:
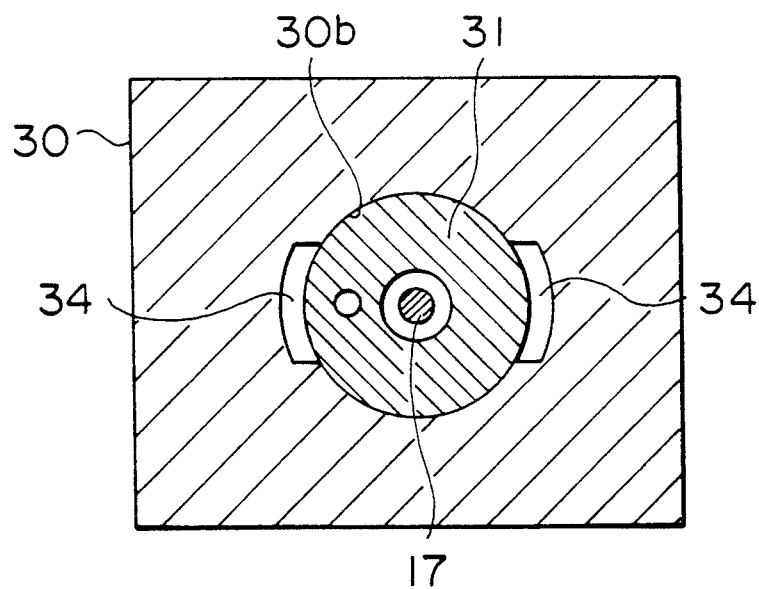
FIG. 4 is a sectional view taken along a line IV—IV in FIG. 3.

Hereinafter, the present invention will be described with reference to an illustrated embodiment. FIG. 3 is a partial sectional view of a high-speed solenoid valve apparatus according to the embodiment of the present invention, and FIG. 4 is a sectional view taken along a line IV—IV in FIG. 3. In these drawings, the same or identical components as those shown in FIG. 2 will be explained by using the same reference numerals. Denoted by 30 is a body of a high-speed solenoid valve apparatus according to this embodiment, 30S is a high-speed solenoid valve section, and 30L is a logic valve section. 31 is a sleeve of the high-speed solenoid valve section 30S which is disposed in place while being guided by guide portions 30a, 30b (FIG. 4) formed on the inner wall of the body 30. The sleeve 31 is formed with a passage 31a and an inlet port 31b. The communication between the passage 31a and the inlet port 31b is blocked off by a spool 17 normally urged by a resilient force of a return spring 24, when the high-speed solenoid valve section 30S is not energized.

Denoted by 32 is a ring-like plate which has an opening bored at the center thereof.

Denoted by 33 is a sleeve of the logic valve section 30L, which is disposed in place while being guided by a guide portion 30c formed on the inner wall of the body 30 similarly to the sleeve 31 and the plate 32. The lower end surface and the outer peripheral surface of the sleeve 33 are in direct contact with the inner wall of the body 30, including the guide portion 30c, without interposing an O-ring therebetween. At these contact surfaces, positive sealing is provided by machining them with high precision.

The sleeve 33 accommodates therein a poppet 21 having a control chamber 22 and a small-diameter penetration hole 23, and is also formed with a projection 33a, an inlet port 33b and an outlet port 33c. The communication between the inlet port 33b and the outlet port 33c is blocked off by the poppet 21 which is subject to the resilient force of the spring 24 and a fluid pressure in the control chamber 22, when the high-speed solenoid valve section 30S is not energized.

The sleeve 31, the plate 32 and the sleeve 33 all have substantially the same outer diameter, and are disposed in closely stacked relation. In a resultant assembly, the plate 32 is guided by the projection 33a of the sleeve 33.

Denoted by 34 are a pair of grooves formed in the guide portion 30b as shown in FIG. 4, and 35, 36 are passages. The passage 31a of the sleeve 31 and the outlet port 12 are communicated with each other via the groove 34 and the passages 35, 36, whereas the outlet port 33c of the sleeve 33 and the outlet port 12 are communicated with each other via the passage 36.

Figure 1:
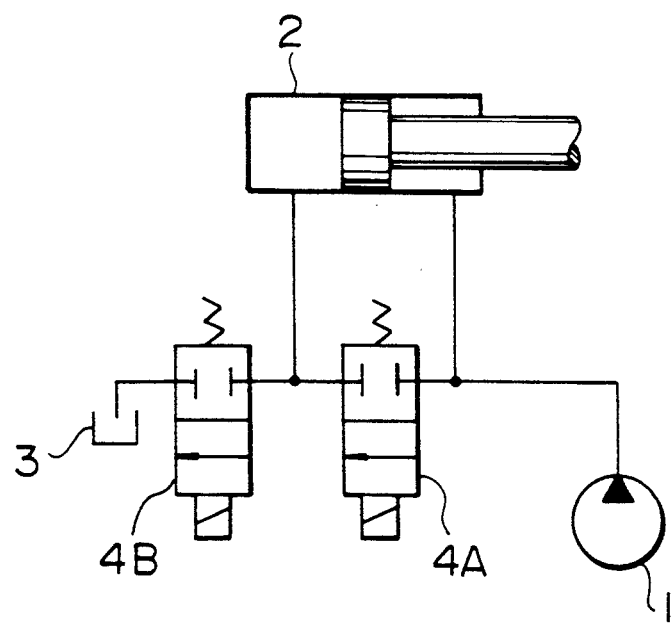
FIG. 1 is a circuit diagram of a hydraulic circuit employing a high-speed solenoid valve apparatus.
Figure 2:
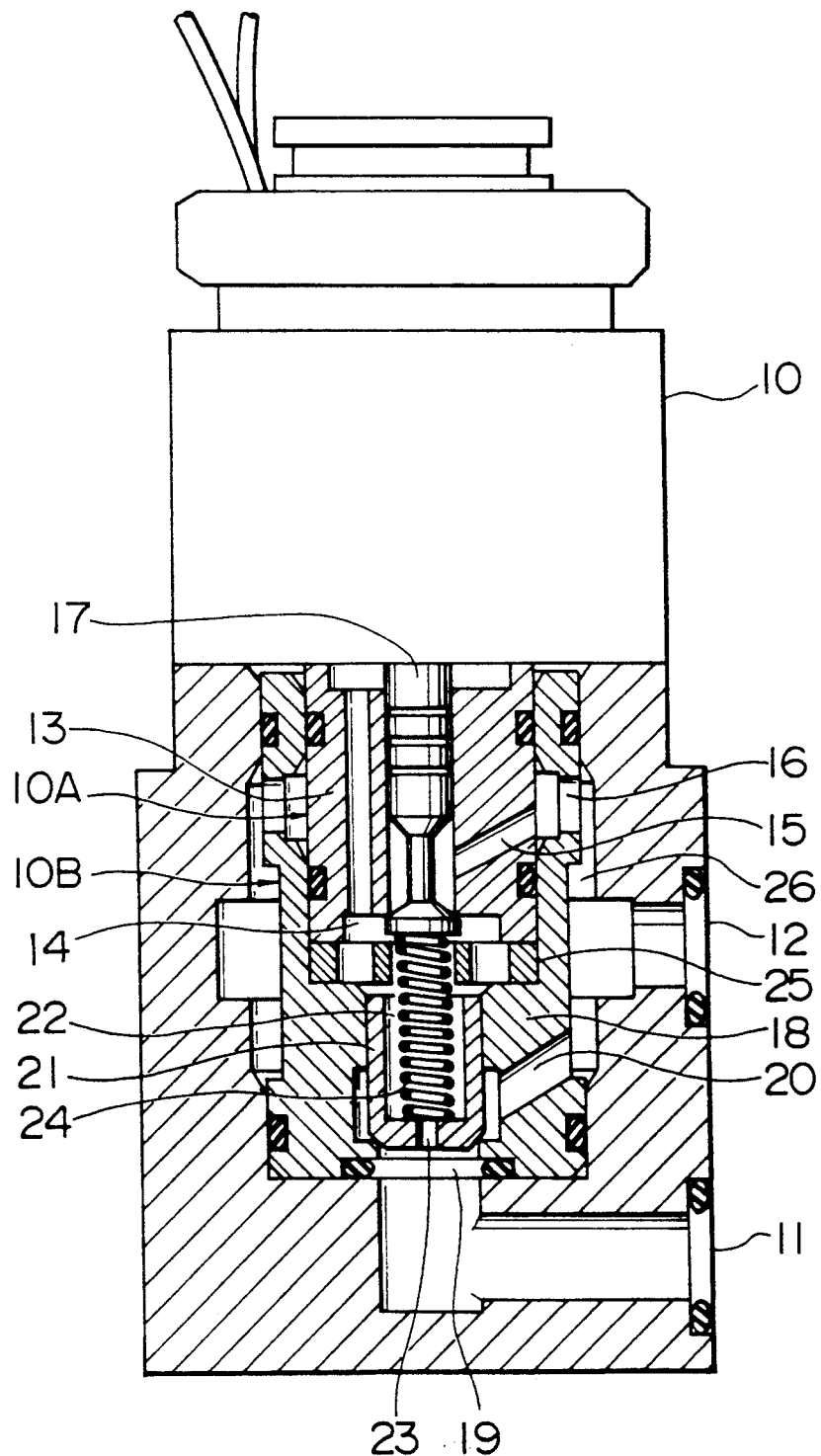
FIG. 2 is a partial sectional view of a conventional high-speed solenoid valve apparatus.

This embodiment operates in a like manner to the high-speed solenoid valve apparatus shown in FIG. 2. More specifically, when the high-speed solenoid valve section 30S is not energized, the spool 17 and the poppet 21 are held in their blocking positions, as a result of which the communication between the inlet port 11 and the outlet port 12 of the high-speed solenoid valve apparatus is blocked off, as explained above.

When the high-speed solenoid valve section 30S is energized, the spool 17 is driven against the resilient force of the return spring 24 so that the inlet port 31b of the sleeve 31 and the passage 31a are communicated with each other. The hydraulic fluid in the control chamber 22 is thereby quickly discharged via the central opening of the plate 32, the inlet port 31b and the passage 31a. Therefore, the pressure in the control chamber 22 is so reduced that the poppet 21 is driven against the resilient force of the return spring 24 due to the hydraulic pressure supplied to the inlet ports 11, 33b, thereby communicating between the inlet port 33b and the outlet port 33c of the sleeve 33. Consequently, the inlet port 11 and the outlet port 12 of the high-speed solenoid valve apparatus are now communicated with each other via two ways.

In this embodiment, as explained above, since the sleeve 31, the plate 32 and the sleeve 33 are guided by the respective guide portions formed on the inner wall of the body 30, there is no need of guiding the first sleeve by the second sleeve, while completely keeping the advantages of the previously proposed high-speed solenoid valve apparatus shown in FIG. 2. As a result, the diametrical dimension of the apparatus can be reduced to a large extent. Also, since the sleeve 33, the plate 32 and the sleeve 31 are installed simply by stacking them in the body in this order, the construction is simplified and the assembling work is facilitated. Moreover, since the lower end surface and the outer peripheral surface of the sleeve 33 are in direct contact with the body without interposing an O-ring therebetween, not only the number of parts but also the number of assembling steps can be reduced.

INDUSTRIAL APPLICABILITY

According to the present invention, since a solenoid valve sleeve, a plate, and a logic valve sleeve are directly guided by the inner wall of a body, it is possible to greatly reduce diametrical dimension, in addition to the advantages of existing apparatus. Furthermore, since the solenoid valve sleeve, the plate, and the logic valve sleeve are installed by being simply stacked in the body, it is possible to simplify the construction and to easily assemble the apparatus.

What is claimed is:

1. In a high-speed solenoid valve apparatus that is ON-OFF-controlled by a digital electrical signal comprising a body having a body inlet port, a body outlet port, and an inner wall, and a high-speed solenoid valve section and a logic valve section both disposed in said body, wherein said high-speed solenoid valve section comprises a solenoid valve outlet port communicating with said body outlet port, a solenoid valve sleeve having an end portion formed with a solenoid valve inlet port and having a first end surface surrounding said solenoid valve inlet port, and a spool for opening and closing a communication path between said solenoid valve inlet port and said solenoid valve outlet port at a high speed in response to said digital electrical signal, said spool having a stem axially movably situated in said solenoid valve sleeve and a valve body integral with said stem situated in said solenoid valve inlet port outside of said solenoid valve sleeve, wherein said logic valve section comprises a logic valve sleeve guided and supported by the inner wall of said body, said logic valve sleeve having a logic valve inlet port formed in one of opposed ends thereof remote from said solenoid valve sleeve and communicating with said body inlet port and a logic valve outlet port communicating with said body outlet port, the other end of said logic valve sleeve facing said solenoid valve sleeve and having a second end surface with an opening therein, a poppet axially movably disposed within said logic valve sleeve and having an end portion for opening and closing a communication path between said logic valve inlet port and said logic valve outlet port, and a control chamber formed in said poppet and communicating with said logic valve inlet port via a small-diameter penetration hole formed in a wall of said end portion of the poppet, and wherein said high-speed solenoid valve section and logic valve section comprises as common elements thereof a common return spring for applying a force in a valve closing direction to said spool and said poppet, and a plate disposed between said end portion of said solenoid valve sleeve and said logic valve sleeve and functioning as a common stopper for said spool and poppet moving in their valve opening directions, said stopper plate having opposed third and fourth end surfaces facing said first and second end surfaces, respectively, and a central opening through which said control chamber communicates with said solenoid valve inlet port and said common return spring having opposed ends one of which extends through said central opening of the stopper plate and abuts with said valve body of the spool and the other of which extends in said control chamber and abuts with an inner surface of the end wall of said poppet, the improvement wherein the inner wall of said body includes a guide portion by which said solenoid valve sleeve end portion is directly guided and supported, said third end surface includes a flat surface portion with which said first end surface is in surface-to-surface contact in a plane, said fourth end surface includes an inner circumferential recessed portion, and said second end surface includes an inner circumferential projecting portion fitted with said inner circumferential recessed portion to position said plate on said logic valve sleeve, so that said solenoid valve sleeve, said plate and said logic valve sleeve are disposed in said body in closely stacked relation, wherein said inner recessed portion of the fourth end surface includes an outer surface portion with which said projecting portion of the second end surface abuts and an inner surface portion flush with said outer surface portion and functions as a stopper surface for said poppet, and wherein said solenoid valve outlet port is directly formed in said solenoid valve sleeve and said guide portion of the inner wall is formed with grooves through which said solenoid valve outlet port is placed in communication with said body outlet port.

2. A high-speed solenoid valve apparatus according to claim 1, wherein said solenoid valve sleeve, said stopper plate and said logic valve sleeve have substantially the same outer diameter.

3. A high-speed solenoid valve apparatus, comprising:

a solenoid body having a body inlet port, a body outlet port, and a first inner wall defining a first chamber;

a solenoid valve sleeve, disposed within the first chamber, having a second inner wall defining a second chamber; an upper surface and a lower surface; and an outer wall that effectively contacts and substantially conforms to at least a portion of the first inner wall; said solenoid valve sleeve including an outlet port in direct communication with the body outlet port, and an inlet port in the lower surface;

a plate, disposed within the first chamber, having a third inner wall defining a third chamber; and upper surface in effective contact with the lower surface of the solenoid valve sleeve in a plane, and a lower surface having an inner circumferential recessed portion; and an outer wall that effectively contacts and substantially conforms to at least a portion of the first inner wall;

a logic valve sleeve, disposed within the first chamber, having a fourth inner wall defining a fourth chamber; an outer wall that effectively contacts and substantially conforms to at least a portion of the first inner wall; an upper surface having an inner circumferential projecting portion fitted with the inner circumferential recessed portion of the lower surface of the plate; a lower surface; a logic valve inlet port in the lower surface and in communication with the body inlet port; and a logic valve outlet port in communication with the body outlet port, wherein said inner recessed portion of the fourth end surface includes an outer surface portion with which said projecting portion of the second end surface abuts and an inner surface portion flush with said outer surface portion and functions as a stopper surface for said poppet;

a spool, disposed at least partially within the second chamber, including means for electrically connecting to an electrical power source to bias the spool to one of relatively open and closed positions responsive to an electrical signal from the electrical power source, said open position enabling communication between the solenoid valve sleeve inlet and outlet ports;

a poppet arranged to move between open and closed positions, disposed at least partially within the logic valve sleeve, including a fifth inner wall defining a fifth chamber, and a penetration hole in communication with the fifth chamber; and spring means operably associated with the spool and the poppet for biasing the spool and the poppet to respective closed positions.

4. A high-speed solenoid valve apparatus as claimed in claim 3, wherein the solenoid valve sleeve, the plate and the logic valve sleeve have substantially the same outer diameter.

5. A high-speed solenoid valve apparatus as claimed in claim 3, wherein the solenoid body further includes an inner bottom wall defining a bottom of the first chamber, and wherein the lower surface of the logic valve sleeve contacts and substantially conforms to the inner bottom wall.

* * * * *